(12) United States Patent
Maeda et al.

(10) Patent No.: US 9,143,019 B2
(45) Date of Patent: Sep. 22, 2015

(54) ROTATING ELECTRIC MACHINE

(71) Applicant: Mitsubishi Electric Corporation, Chiyoda-ku, Tokyo (JP)

(72) Inventors: Naohide Maeda, Chiyoda-ku (JP); Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 266 days.

(21) Appl. No.: 13/913,604

(22) Filed: Jun. 10, 2013

(65) Prior Publication Data

US 2014/0203675 A1 Jul. 24, 2014

(30) Foreign Application Priority Data

Jan. 24, 2013 (JP) ................................. 2013-010769

(51) Int. Cl.
*H02K 9/00* (2006.01)
*H02K 9/06* (2006.01)
*H02K 11/04* (2006.01)

(52) U.S. Cl.
CPC ................ *H02K 9/06* (2013.01); *H02K 11/048* (2013.01)

(58) Field of Classification Search
CPC ............. H02K 9/06; H02K 9/18; H02K 9/19; H02K 1/20
USPC ...... 310/52, 54, 58, 59, 64, 68 A, 68 B, 68 C, 310/68 D, 68 E
See application file for complete search history.

(56) References Cited

U.S. PATENT DOCUMENTS

| 3,800,173 | A | * | 3/1974 | Rosenberry, Jr. | ............... 310/59 |
| 7,847,445 | B2 | * | 12/2010 | Nishitani et al. | ............... 310/52 |
| 8,970,076 | B2 | * | 3/2015 | Isoda et al. | ..................... 310/59 |
| 2006/0181162 | A1 | | 8/2006 | Pierret et al. | |
| 2010/0289351 | A1 | | 11/2010 | Maeda et al. | |

FOREIGN PATENT DOCUMENTS

| JP | 05-227697 A | 9/1993 |
| JP | 08-214499 A | 8/1996 |
| JP | 2001-178079 A | 6/2001 |
| JP | 2004-312852 A | 11/2004 |
| JP | 2006-504386 A | 2/2006 |
| JP | 2010-268541 A | 11/2010 |

OTHER PUBLICATIONS

Japanese Office Action (Notification for Refusal) issued Feb. 12, 2014, Application No. 2013-010769.

* cited by examiner

*Primary Examiner* — Hanh Nguyen
(74) *Attorney, Agent, or Firm* — Sughrue Mion, PLLC; Richard C. Turner

(57) ABSTRACT

The rotating electric machine is configured in such a way that a surface of the heat sink, on which the cooling fins of the heat sink are formed, faces the housing; and a plate, which blocks the surface of the housing facing the heat sink and forms a wind passage between the heat sink and the plate, intervenes between the cooling fins and the surface of the housing facing the heat sink; and outside air is aspirated from an inlet formed on the protective cover, and then, the outside air is passed through the wind passage formed between the heat sink and the plate so as to be passed through a window formed on the housing, and is exhausted, by the cooling fan of the rotor, from an outlet formed on the housing.

15 Claims, 4 Drawing Sheets

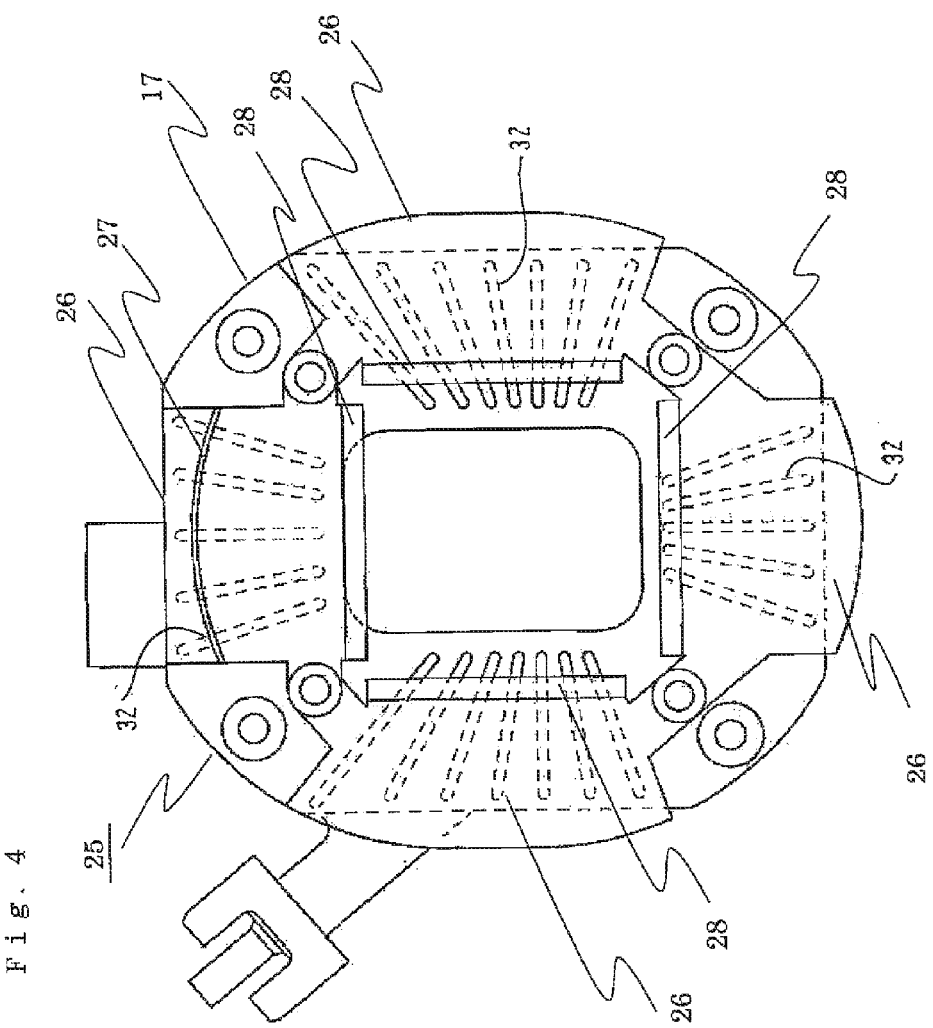

ROTATING ELECTRIC MACHINE

BACKGROUND OF THE INVENTION

1. Field of the Invention

The present invention relates to a rotating electric machine used for a vehicle or the like, which is linked to an engine, and particularly relates to a cooling mechanism for radiating heat generated from the rotating electric machine.

2. Description of the Related Art

In a conventional rotating electric machine used for a vehicle, it has been suggested that a power assembly having switching elements, which supply electric current to a rotor having armature coils, and a control assembly having a control circuit, which controls the power assembly, are mounted on the rotating electric machines (for example, refer to Patent Document 1 and Patent Document 2).

In the rotating electric machine described in Patent Document 1, power modules composed of power semiconductor devices, insulating substrates, and heat sinks are mounted on a bracket (housing), and fins are formed on the heat sink. A fan is mounted on a rotor, and cooling wind is generated by rotating the rotor. The rotating electric machine is configured in such a way that a window for passing wind is formed on the bracket, and the cooling wind passed through the fins is exhausted from an aperture of the bracket via the window of the bracket.

Patent Document
[Patent Document 1]
Japanese Laid-Open Patent Publication No. 2004-312852 (Embodiment 2, FIG. 3 and FIG. 5)
[Patent Document 2]
Japanese Laid-Open Patent Publication No. 2010-268541 (Embodiment 3, FIG. 7)

In the rotating electric machine described in Patent Document 1, power modules are mounted overall an end surface of the bracket, and in order to effectively use the fins formed on the heat sink, it is required that the window of the bracket is formed near a rotary shaft provided at a center of the rotating electric machine. However, the bracket must hold the rotor and the stator, and a metal material is usually used for the bracket because of a structural factor. Therefore, because components without the window are covered, there is a problem in that a weight of the rotating electric machine is increased. Moreover, the bracket holds the stator as described above, so that a temperature of the bracket becomes high by a heat transfer from the stator. Therefore, when a wind passage is configured by using the bracket and the heat sink, a cooling efficiency of the heat sink, on which power modules are mounted, is deteriorated by radiant heat transmitted from the bracket to the cooling wind or radiant heat transmitted from the bracket to the heat sink.

On the other hand, in the rotating electric machine described in Patent Document 2, it is suggested that a power circuit having switching elements is mounted on a surface of the heat sink, and fins are provided on the other surface, and a stator coil and a relay plate for connecting a stator coil and the power circuit are provided at an opposite side of the fins of the heat sink, and moreover, a wind passage is configured by using the heat sink and the relay plate.

In the rotating electric machine described in Patent Document 2, the heat sink, on which a power circuit is mounted, is mounted in the inside of the housing, so that there has been a problem in that an inlet for cooling wind is positioned near an outlet, and the exhausted air is circulated, whereby temperature of the aspirated air is increased. Moreover, it is required that a bus bar for connecting a stator coil to the power circuit is provided on the relay plate. Because the whole parts of the bus bar, without a connecting portion, must be insulated, a thickness of the relay plate is increased. When the thickness of the relay plate is increased, a size in an axis direction of the rotating electric machine is increased. Moreover, in order to prevent the size in an axis direction of the rotating electric machine from changing, it is required that the fins of the heat sink become short so as reduce the thickness of the relay plate. In a former case, the size of the rotating electric machine is increased, whereby the weight of the rotating electric machine is increased. In a later case, the fins become short, whereby a cooling capacity of the heat sink is deteriorated.

SUMMARY OF THE INVENTION

The present invention has been made to solve above-described problems, and an object of the invention is to provide a rotating electric machine which has a light weight and an excellent cooling capability.

A rotating electric machine of the present invention comprises a stator that includes armature coils; a pair of housings, which are disposed at both end portions in an axis direction of the stator, for holding the stator; a rotor, including a magnetic field coil and a magnetic field core, which is disposed at an inner circumference side of the stator in a state where a rotary shaft is freely rotated and held by bearings in the pair of housings; cooling fans which are provided at end portions in an axis direction of the rotor; power modules that include switching elements for controlling armature current passed through the armature coils; a magnetic field module that includes switching elements for controlling magnetic field current passed through the magnetic field coil; a heat sink, facing a housing that is one of the pair of housings, which is installed at an opposite side of the rotor and the stator, and mounts the switching elements of the power modules so as to cool the switching elements; and a protective cover for covering the heat sink in which the switching elements of the power modules are mounted; wherein cooling fins are protruded and formed, in the heat sink, on an opposite surface with respect to a surface on which the switching elements are mounted; and the surface of the heat sink, on which the cooling fins of the heat sink are formed, faces the housing which is one of the housings; and a plate, which blocks the surface of the housing facing the heat sink and forms a wind passage between the heat sink and the plate, intervenes between the cooling fins and the surface of the housing facing the heat sink; and outside air is aspirated from an inlet formed on the protective cover, and then, the outside air is passed through the wind passage formed between the heat sink and the plate so as to be passed through a window formed on the housing which is one of the housings, and is exhausted, by the cooling fan of the rotor, from an outlet formed on the housing which is one of the housings.

In the rotating electric machine of the present invention, the plate, which blocks the surface, facing the heat sink, of the housing and forms a wind passage between the heat sink and the plate, intervenes between the cooling fins and the surface, facing the heat sink, of the housing, so that the cooling fins are cooled by the outside air passed through the wind passage, and the switching elements mounted in the heat sink can be effectively cooled. The wind passage is formed between the heat sink 17 and the plate 26, whereby the outside air can be guided to an area near a center of a rotary shaft, and components placed near the rotary shaft can be effectively cooled. The plate, which blocks the surface, facing the heat sink, of the housing, intervenes between the cooling fins and the surface, facing the heat sink, of the housing, so that it can be prevented that heat of the housing, which are received from the rotor, is radiated to the heat sink or the outside air passing through the wind passage. In addition, the wind passage is formed by using the heat sink and the housing, or the wind passage is formed by using the heat sink and the plate, so that thicknesses of the components can be thinned, and a weight of the rotating electric machine can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a plane view illustrating an inverter assembly of a rotating electric machine according to Embodiment 2 of the present invention.

DETAILED DESCRIPTION OF THE PREFERRED EMBODIMENTS

An example of a rotating electric machine, which can restart an engine being connected to the machine when the machine is used as a motor, and can supply electric power to a vehicle or charge a battery when the machine is used as a generator, will be explained in the following embodiments.

Embodiment 1

Figure 1:
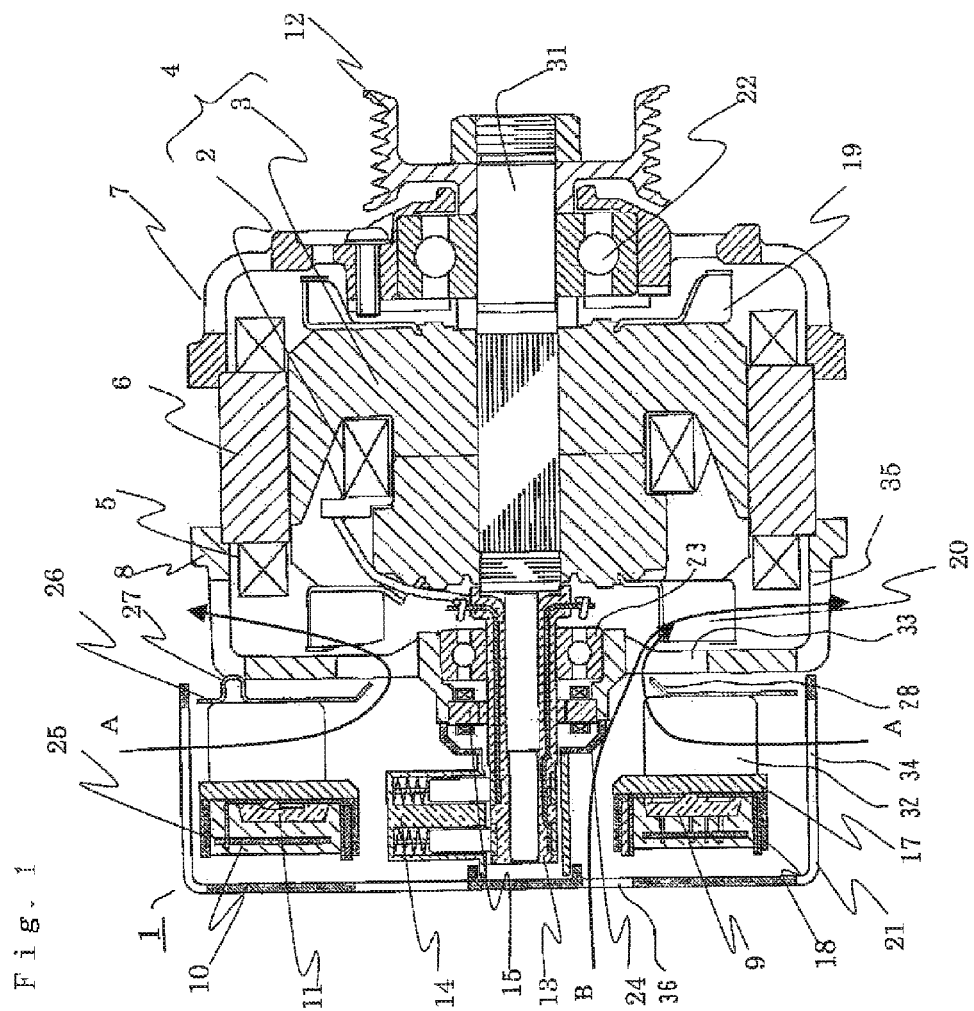
FIG. 1 is a longitudinal cross-sectional view illustrating a rotating electric machine according to Embodiment 1 of the present invention.
Figure 2:
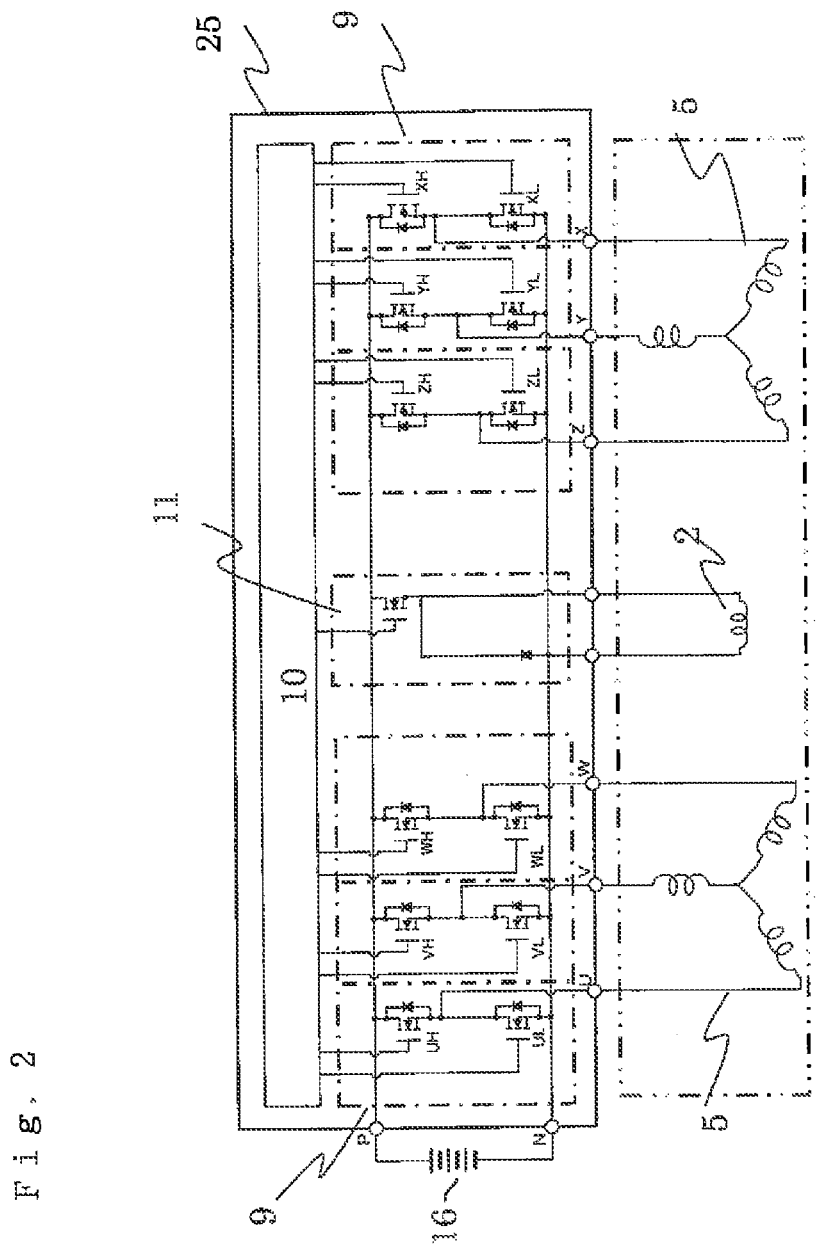
FIG. 2 is an electric circuit diagram of the rotating electric machine according to Embodiment 1 of the present invention.
Figure 3:
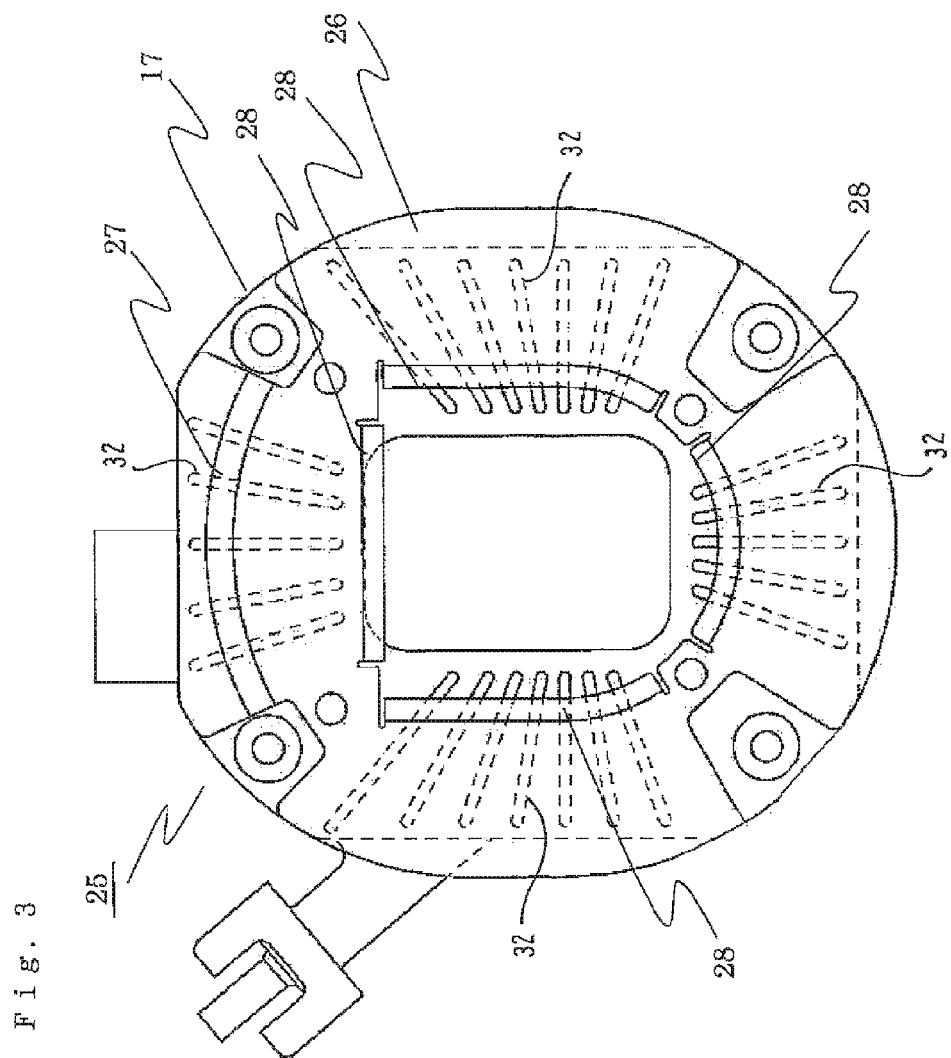
FIG. 3 is a plane view illustrating an inverter assembly of the rotating electric machine according to Embodiment 1 of the present invention.

FIG. 1 is a longitudinal cross-sectional view illustrating a rotating electric machine according to Embodiment 1 of the present invention; FIG. 2 is an electric circuit diagram of the rotating electric machine according to Embodiment 1 of the present invention; and FIG. 3 is a front-side plane view illustrating an inverter assembly of the rotating electric machine according to Embodiment 1 of the present invention.

In FIG. 1, a rotating electric machine 1 includes a stator 6 having armature coils 5; a pair of housings 7 and 8, for supporting the stator 6, which are disposed at both end portions in an axis direction of the stator 6; and a rotor 4 having a magnetic field coil 2 and a magnetic field core 3, which is disposed at an inner circumference side of the stator 6, in a state where a rotary shaft 31 is freely rotated and held via bearings 22 and 23 in the pair of housings 7 and 8. The housing 7 is used as a front housing, and it supports the rotary shaft 31 by the front bearing 22. The housing 8 is used as a rear housing, and it supports the rotary shaft 31 by the rear bearing 23.

The magnetic field core 3 is a claw-pole-type core, and the magnetic field coil 2 is winded around the magnetic field core 3 so as to be held. A pulley 12, which receives or gives torque from/to an internal-combustion engine (not illustrated), is mounted on a front-end portion of the rotor 4, and the pulley 12 is linked to the internal-combustion engine via a belt. The rotor 4 includes a slip ring 13 for supplying a magnetic field current, and the slip ring 13 is connected to the magnetic field coil 2 so as to be fixed at an outer surface of the rotary shaft 31 that is protruded from the rear housing 8 toward the rear side.

A brush holder 14 is contacted to the slip ring 13, in a freely sliding state, by pressing a brush to the slip ring 13, whereby the magnetic field current is supplied to the slip ring 13 via the brush.

Cooling fans 19 and 20, which generate cooling wind by rotating the rotor 4, are provided on both end portions in an axis direction of the rotor 4, in other words, on both end portions of the magnetic field core 3. A rotation sensor 15 for detecting a rotational phase of the rotor 4 is covered by a rotation-sensor cover 24 and mounted, between the slip ring 13 and a rear bearing 23, on the rotary shaft 31. The rotation sensor 15 is composed of a sensor rotor, which is fixed to the rotary shaft 31, and a rotation detecting portion for detecting the rotational phase of the rotor 4.

Power modules 9 include switching elements and peripheral circuits, by which armature current is supplied and controlled when the engine is driven or the armature current is rectified and controlled when electric power is generated, and these components are disposed on a lead frame used for electrical wiring so as to be molded by a resin material. A magnetic field module 11 includes switching elements and peripheral circuits, by which the magnetic field current is supplied and controlled, and these components are disposed on a lead frame used for electrical wiring so as to be molded by a resin material. A control module 10 includes a control circuit for controlling the switching elements of the power module 9 and the magnetic field module 11.

As illustrated in FIG. 1 and FIG. 3, a heat sink 17 is vertically disposed with respect to the rotary shaft 31. Moreover, the heat sink 17 is formed as a circular plate surrounding the rotary shaft 31, in a state where a gap is provided between the heat sink 17 and the rotary shaft 31, and is used as a heat conductor made from aluminum, copper or the like. In the heat sink 17, for example, the power modules 9 are decentrally disposed at a lower portion and both sides in FIG. 3, and the magnetic field module 11 is disposed at an upper portion in FIG. 3. Moreover, the power modules 9 and the magnetic field module 11 are directly fixed or fixed in a state where an insulation material intervenes, and the switching elements mounted in the power modules 9 and the magnetic field module 11 are cooled. The power modules 9, the magnetic field module 11, and the control module 10 are housed in a case 18, and each of the modules includes a connection terminal for connecting the modules to external units. An inverter assembly 25 is composed of the power modules 9, the magnetic field module 11, the control module 10, the case 18, and the heat sink 17.

The inverter assembly 25 (refer to FIG. 1 and FIG. 3) is installed at a rear side of the rear housing 8, and the rotary shaft 31 and the brush holder 14 are arranged in a center hole. The brush of the brush holder 14 and the magnetic field module 11 are connected, and signal wires, extended from the stator, of rotation sensor 15, which is positioned between the brush holder 14 and the rear housing 8, are connected to the control module 10. Moreover, the power modules 9 and the armature coils 5 are connected. In addition, although the heat sink 17 is totally integrated in Embodiment 1, a heat sink, in which the switching elements of the power modules 9 are mounted, may be separated from a heat sink, in which the switching elements of the magnetic field module 11 are mounted, and the heat sinks may be decentrally disposed around the rotary shaft 31. The inverter assembly 25 and the brush holder 14 are covered by a protective cover 21 that is provided on an outer surface of the inverter assembly 25.

In the heat sink 17 of the inverter assembly 25, a plurality of cooling fins 32 are protruded so as to be formed on an opposite surface with respect to a surface on which the switching elements of the power modules 9 or the magnetic field module 11 are mounted, and the heat sink 17 is mounted at an opposite side of the rotor 4 and the stator 6 with respect to the rear housing 8 in a state where the surface of the heat sink 17, on which the cooling fins 32 are formed, are faced to the rear housing 8. The plurality of cooling fins 32 of the heat sink 17 are integrally formed at 90° angle intervals in a radial direction of the heat sink 17, and the cooling fins 32 correspond to positions of the switching elements of the power modules 9 and the magnetic field module 11 which are decentrally disposed. The plurality of cooling fins 32 of the heat sink 17 are formed in such a way that those are protruded and extended toward the rear housing 8. The heat sink 17 as well as the rear housing 8 is maintained at ground potential of a vehicle.

A plate 26, which blocks a rear-housing surface facing the cooling fins 32 and is composed of a wind passage in a diameter direction between the heat sink 17 and the plate 26, intervenes between the cooling fins 32 of the heat sink 17 and the rear-housing surface facing the cooling fins 32. It is suitable that the plate 26 is fixed to a tip at the rear housing 8 side of the plurality of cooling fins 32.

The plate 26 has an annular shape extended along the rear side of the rear housing 8 (refer to FIG. 1 and FIG. 3), and the plate 26 is extended from the outer circumference of the heat sink 17 to a frontward position of the inner circumference of the heat sink 17. In other words, the plate 26 is formed in an annular shape in a state where the plate 26 faces a surface of the heat sink 17, on which the cooling fins 32 are formed, and covers almost whole surface of the heat sink 17. Thereby, the wind passage can be formed in a wide area, and a cooling capability of the heat sink 17 can be improved. An installation area, which installs the rear bearing 23 for holding the rotary shaft 31, is formed at a center portion of the rear housing 8, and a window 33 doubling as a wind passage is formed at an outer diameter side of the installation area for the rear bearing 23. At an area in which the cooling fins 32 of the heat sink 17 are not formed (refer to FIG. 3), notches are formed on the plate 26, and mounting bolts (not illustrated) for the heat sink 17 are disposed.

The window 33 is wider than the wind passage, whereby it is intended that weight of the rotating electric machine is reduced. In other words, the window 33 is formed in such a way that the inner circumference side of the plate 26 faces the rotary shaft 31 in a diameter direction in order to block a part of the window 33 formed on the rear housing 8 facing the plate 26. A first inlet 34 for aspirating outside air toward the outer surface is formed on the protective cover 21. Thereby, the outside air (cooling wind) is aspirated from the first inlet 34, in other words, from a diameter direction to an inner side, and passes through the wind passage formed between the heat sink 17 and the plate 26. Moreover, the outside air passes through (in an axis direction) the window 33 of the rear housing 8, and is exhausted by the cooling fan 20 of the rotor 4 (exhausted to the outside in a diameter direction through an end surface of the magnetic field core 3), and then, the outside air is exhausted from an outlet 35, which is formed on an outer surface of the rear housing 8, to the outside (the first passage is indicated by an arrow "A" in FIG. 1).

Thereby, the cooling fins 32 of the heat sink 17 are cooled, and the switching elements of the power modules 9 and the magnetic field module 11 mounted in the heat sink 17 are effectively cooled. Moreover, the rear bearing 23 is cooled, and the rotor 4 and the stator 6 are cooled. A cooling wind can be guided to the inner surface (near the rotary shaft 31) by forming one of the walls of a cooling wind passage by the plate 26, so that a cooling capacity is not varied even if the window 33 of the rear housing 8 is widened. As a result, a weight of the rotating electric machine can be reduced. Moreover, because the cooling wind can be guided near the rotary shaft 31, cooling capacities of the brush holder and the rear bearing are improved.

Moreover, a second inlet 36 for aspirating the cooling air toward an area near the rotary shaft 31 is formed on the protective cover 21. Therefore, the cooling air is aspirated from the second inlet 36, in other words, from an axis direction, and the cooling air is passed through a wind passage between the heat sink 17 and the rotary shaft 31, and passed through the window 33 of the rear housing 8, and then, the cooling air is exhausted, by the cooling fans 20 of the rotor 4, from the outlet 35 formed on the rear housing 8 (the second passage is indicated by an allow "B" in FIG. 1). Thereby, the slip ring 13, the brush holder 14, and the rotation sensor 15 are cooled, and moreover, the rear bearing 23, the rotor 4, and the stator 6 are cooled. As described above, the passages for the cooling air are separated in accordance with each of the components for being cooled, whereby each of the configurations of the passages can be optimized. At the same time, components around each of the passages can be cooled by cold outside air, so that the components can be effectively cooled.

Because the rear housing 8 holds the stator 6 and the rotor 4, of which temperatures are high in the rotating electric machine, a temperature of the rear housing 8 is increased by a heat transfer from these components. Therefore, heat dissipation from the rear housing 8 to the heat sink 17 can be prevented by inserting the plate 26 between the rear housing 8 and the heat sink 17 having the cooling fins 32. Moreover, because the wind passage at the inlet side is not configured by the rear housing 8, the heat sink 17 can be cooled by the cold outside air (cooling wind), and a temperature of the inverter assembly 25 can be decreased.

Even when the inverter assembly 25 is protruded in a diameter direction of the rear housing 8 in accordance with a form or a size of the inverter assembly 25, a wind passage can be formed by using the plate 26, and the cooling capability of the rotating electric machine can be improved. Moreover, when a portion of the inverter assembly 25, which is protruded from the rear housing 8, is blocked by the plate 26, reflux of the cooling air exhausted from the rear housing 8 can be prevented, and a foreign material, which is invaded from the rear housing 8 side to an inside portion of the rotating electric machine, can be prevented.

It is suitable that the plate 26 is manufactured by pressing a metal plate such as an iron plate or an aluminum plate. The plate 26 can be cheaply manufactured by pressing the metal plate. Moreover, the wind passage is only formed, and a low structural strength is required, so that a thickness of the metal plate can be thinned in about 0.5 mm, and a size in an axis direction of the rotating electric machine can be decreased. The plate 26 may be manufactured by molding a PPS resin or a PBT resin, whereby the plate 26 can be cheaply manufactured in the same way of processing the metal plate. When the plate 26 is made of the resins, a heat transfer from the rear housing 8 is decreased, so that a heat transfer to the heat sink 17 having the cooling fins 32 can be reduced, and the temperature of the inverter assembly 25 can be decreased.

A wind guide 28 is integrally formed at a tip on the inner circumference side of the plate 26, whereby an influent direction of an outside air is smoothly changed from a diameter direction to an axis direction, and the outside air is guided to the wind passage formed by the window 33 of the rear housing 8. Thereby, resistance of the wind passage can be decreased, and flow velocity of the cooling wind is increased, so that a cooling capacity of the inverter assembly 25 can be improved.

When the inverter assembly 25 is fixed to the rear housing 8, there is a problem in that a gap for absorbing a dimensional deviation of the components exists between the plate 26 and the rear housing 8 facing to the plate 26, and the outside air is aspirated from the gap, so that an amount of the outside air, which is passing through the wind passage between the heat sink 17 and the plate 26, is reduced. Therefore, in Embodiment 1, an intake stopper 27, which is extended in a circumference direction so as to cover the gap, is integrally formed at an end portion on an outer circumference side of the plate 26 (refer to FIG. 3). In FIG. 3, although the intake stopper 27 is formed at the upper side of the plate 26 facing to the heat sink 17, the intake stopper 27 may be formed at the both sides or the lower side of the plate 26 facing to the heat sink 17.

An electric circuit diagram of the rotating electric machine illustrated in FIG. 2 will be explained. In Embodiment 1, two groups of three-phase armature coils 5 are provided. When the rotating electric machine is operated as a motor, an instruction is provided so as to pass the magnetic field current from the control module (assembly) 10 to the magnetic field module (assembly) 11, whereby the magnetic field coil 2 is excited. Next, three-phase AC current is passed through the armature coils 5 by controlling the power modules (assembly) 9 via the control module 10, whereby the rotor 4 is rotated, and torque is outputted.

On the other hand, when the rotating electric machine is operated as a generator, an instruction for necessary generation current is received from the outside controller, and the control module 10 provides an instruction to the magnetic field module 11 so as to pass a current through the magnetic field coil 2 in accordance with the required generation current. Moreover, when phase voltage, which is measured by the control module 10, is exceeded the output voltage, the control module 10 provides an instruction to the power modules 9 in order to switch the switching elements, whereby an AC current generated in the armature coils 5 is rectified and converted into a DC current.

Embodiment 2

FIG. 4 is a plane view illustrating an inverter assembly 25, which is viewed from a front side, of a rotating electric machine according to Embodiment 2 of the present invention. Plates 26 are formed only on a portion at which cooling fins 32 of a heat sink 17 are protruded. In the inverter assembly 25, temperatures of switching elements of power modules 9 and a magnetic field module 11 become high, so that it is required that the cooling fins are protruded on the back side of the heat sink 17, on which at least both switching elements are fixed. In contrast, when cooling fins 32 of the other components are omitted, a weight reduction and a yield ratio of the eat sink 17 can be improved, and a flexibility of a configuration for fitting the inverter assembly 25 to a rear housing 8 can be obtained.

Connection wirings for armature coils 5 and the power modules 9 as well as a component for fitting the inverter assembly 25 to the rear housing 8 are disposed between the inverter assembly 25 and the rear housing 8, and an area, in which intake of cooling wind is difficult, is placed. When the plates 26 are disposed only at a portion facing the cooling fins 32 of the heat sink 17, a size of the plates 26 can be reduced without varying a cooling effect, and a cost can be reduced by reducing a weight of the plates 26 or by improving a yield ratio of materials of the plates 26. Moreover, when the inlet for the outside air is formed as a component of the cooling fins, airflow of the cooling wind at one position can be increased, and a cooling capacity of the cooling fins can be improved.

Also in Embodiment 2, the configurations of the components, without the above-described components, which are used in Embodiment 1, can be applied. Four plates 26 are mounted in FIG. 4. Although the plates 26 mounted on both end portions have the same shape in Embodiment 2, a number of the plates 26, without the plates by which the components must be especially cooled, may be reduced. A cost of the rotating electric machine can be reduced by reducing the number of the plates 26 while a cooling capacity of the components, which must be especially cooled, is kept.

In addition, in the scope of the present invention, it is possible that each of embodiments is freely combined, or each of embodiments is suitably modified or omitted.

What is claimed is:

1. A rotating electric machine comprising:
a stator that includes armature coils;
a pair of housings disposed at both end portions in an axial direction of the stator, for holding the stator;
a rotor, including a magnetic field coil and a magnetic field core, disposed at an inner circumference of the stator such that a rotary shaft is freely rotated and held by bearings within the pair of housings;
cooling fans provided at end portions in an axial direction of the rotor;
power modules that include switching elements for controlling armature current passed through the armature coils;
a magnetic field module that includes switching elements for controlling magnetic field current passed through the magnetic field coil;
a heat sink, facing a housing that is one of the pair of housings and, which is installed at an opposite side of the rotor and the stator, and mounts the switching elements of the power modules so as to cool the switching elements; and
a protective cover for covering the heat sink on which the switching elements of the power modules are mounted; wherein
cooling fins are protruded and formed, in the heat sink, on an opposite surface with respect to a surface on which the switching elements are mounted; and the surface of the heat sink, on which the cooling fins of the heat sink are formed, faces the housing which is one of the housings; and a plate, which blocks the surface of the housing facing the heat sink and forms a wind passage between the heat sink and the plate, intervenes between the cooling fins and the surface of the housing facing the heat sink; and outside air is aspirated from an inlet formed on the protective cover, and then, the outside air is passed through the wind passage formed between the heat sink and the plate so as to be passed through a window formed on the housing which is one of the housings, and is exhausted, by the cooling fan of the rotor, from an outlet formed on the housing which is one of the housings.

2. A rotating electric machine as recited in claim 1, wherein the plate is formed in an annular shape in a state where the plate faces the surface of the heat sink, on which the cooling fins are formed, and covers the surface of the heat sink.

3. A rotating electric machine as recited in claim 2, wherein the wind passage is formed between the plate and the heat sink, and an inner circumference side of the plate blocks a part of a window formed on the housing, facing the plate, which is one of the housings.

4. A rotating electric machine as recited in claim 2, wherein the plate covers a gap between the plate and the housing, facing the plate, which is one of the housings, and includes an intake stopper for preventing the outside air from being aspirated from the gap.

5. A rotating electric machine as recited in claim 2, wherein the plate includes a wind guide, at a tip on an inner circumference side of the plate, which changes a cooling-wind direction from a diameter direction to an axis direction.

6. A rotating electric machine as recited in claim 1, wherein the plate is formed in such a way that the plate faces the surface of the heat sink and covers the cooling fins formed on the heat sink.

7. A rotating electric machine as recited in claim 6, wherein the wind passage is formed between the plate and the heat sink, and an inner circumference side of the plate blocks a part of a window formed on the housing, facing the plate, which is one of the housings.

8. A rotating electric machine as recited in claim 1, wherein the wind passage is formed between the plate and the heat sink, and an inner circumference side of the plate blocks a part of a window formed on the housing, facing the plate, which is one of the housings.

9. A rotating electric machine as recited in claim 8, wherein the plate covers a gap between the plate and the housing, facing the plate, which is one of the housings, and includes an intake stopper for preventing the outside air from being aspirated from the gap.

10. A rotating electric machine as recited in claim 8, wherein the plate includes a wind guide, at a tip on an inner circumference side of the plate, which changes a cooling-wind direction from a diameter direction to an axis direction.

11. A rotating electric machine as recited in claim 1, wherein the plate is made of a metal plate.

12. A rotating electric machine as recited in claim 1, wherein the plate is made of a resin.

13. A rotating electric machine as recited in claim 1, wherein the plate covers a gap between the plate and the housing, facing the plate, which is one of the housings, and includes an intake stopper for preventing the outside air from being aspirated from the gap.

14. A rotating electric machine as recited in claim 13, wherein the plate includes a wind guide, at a tip on an inner circumference side of the plate, which changes a cooling-wind direction from a diameter direction to an axis direction.

15. A rotating electric machine as recited in claim 1, wherein the plate includes a wind guide, at a tip on an inner circumference side of the plate, which changes a cooling-wind direction from a diameter direction to an axis direction.

* * * * *